United States Patent

[11] 3,630,492

| [72] | Inventor | Manfred Hubner |
| | | New Haven, Conn. |
| [21] | Appl. No. | 69,530 |
| [22] | Filed | Sept. 4, 1970 |
| [45] | Patented | Dec. 28, 1971 |
| [73] | Assignee | USM Corporation |
| | | Boston, Mass. |

[54] MIXING APPARATUS
10 Claims, 3 Drawing Figs.

[52] U.S. Cl. ................................................ 259/8
[51] Int. Cl. ................................................ B01f 7/26
[50] Field of Search ........................................ 259/8, 23, 24, 43, 44, 2, 6, 7

[56] References Cited
UNITED STATES PATENTS

| 2,953,359 | 9/1960 | Mau | 259/8 |
| 3,051,454 | 8/1962 | Goos | 259/23 |
| 3,400,914 | 9/1968 | Benassi | 259/8 |

Primary Examiner—Robert W. Jenkins
Attorneys—Richard A. Wise, Richard B. Megley and Vincent A. White ABSTRACT: A mixing device comprising a rotor, on the center of which dry ingredients are deposited for mixing by external agitation, and a stator spaced from the rotor forming a chamber in which liquid ingredients are introduced, wetting the dry ingredients moved along a face of the rotor by centrifugal force forming a viscous mass which is mixed by internal shear forces in the chamber.

Patented Dec. 28, 1971

Inventor
Manfred Hubner
By his Attorney
Vincent A. White

Patented Dec. 28, 1971 3,630,492

MIXING APPARATUS

FIELD OF THE INVENTION

The invention relates to a device for mixing dry and liquid ingredients by a combination of agitation of the dry ingredients by external force application and by internal shearing forces applied to a mixture of the dry ingredients and liquid ingredients.

BACKGROUND OF THE INVENTION

It is well known that the inclusion of fibers, especially of glass, in molded plastic articles greatly increases the strength of the articles. However, it is essential that the length and certain bundle integrity be maintained in the molding process or the advantages of the fibers are greatly lost. The danger of fiber breakage, however, is great because of the brittleness of glass. To improve the flexural and impact strength, the fibers are generally provided with a surface coating. One tendency in the industry is the development of improved surface coatings. The other direction is the development of mixtures which do not rely on agitation as mixing action but which achieve a thorough mixing and wetting of the glass by low shear. Such a mixer design would prevent high impact on the fiber bundles during the mixing cycle and therefore diminish glass breakage.

In case of liquid or pastelike resins, the fibers and resins have been mixed in the past in discontinuous batch-type mixers with low-speed agitation by stirrer or shear blades. This type of operation requires bulk storage and manual handling, and does not lend itself to the economies possible in a continuous mixing process set up at the point of use such as at an automatic injection molding machine. It is known to use a screw-type plasticator—extruder, both to mix the materials as well as to extrude the mixtures. However, the use of such apparatus has resulted in an insufficient wetting of all components with the resin prior to injection as well as breakage of the glass fibers and loss of bundle integrity due to high shear in the screw channel.

STATEMENT OF THE INVENTION

Accordingly, it is an object of the invention to provide a mixing device which overcomes the above objections. To this end, a mixing apparatus is provided with a rotating plate having a face forming one side of an annular mixing chamber, the other side of which is formed by a fixed surface. The fixed surface has a central opening through which dry ingredients such as glass fibers and fillers are deposited on the central portion of the rotating plate for mixing. The dry ingredients of the mixture are carried outwardly along the face of the plate by centrifugal force while a liquid ingredient of the mix is sprayed thereon to thoroughly wet the dry ingredients to form a viscous mixture. This viscous mixture is mixed by internal shear forces caused by the relative motion between the fixed surface and the rotating face of the plate. The mixture is also caused to be mixed by a rolling action which does not break or chop the fibers as they are mixed.

According to one feature of the invention, the mixing chamber is provided with an outlet to which the mixture is directed by a blade. A throttle blade in the outlet varies the size of opening to create a back pressure on the mixture and thus to vary the residence time of the mix in the chamber as well as to vary the intensity of the wetting and mixing action.

A further feature provides for varying the space between the plate and the fixed surface to change the shear intensity and the size of the mixing chamber. By supplying the moving plate face and/or the fixed surface with different surfaces, different mixing and shearing actions may be provided suitable for the materials to be mixed.

A preferred embodiment of the invention will now be described with reference to the drawings and thereafter particularly pointed out in the appended claims.

DESCRIPTION OF THE PREFERRED EMBODIMENT

Figure 1:
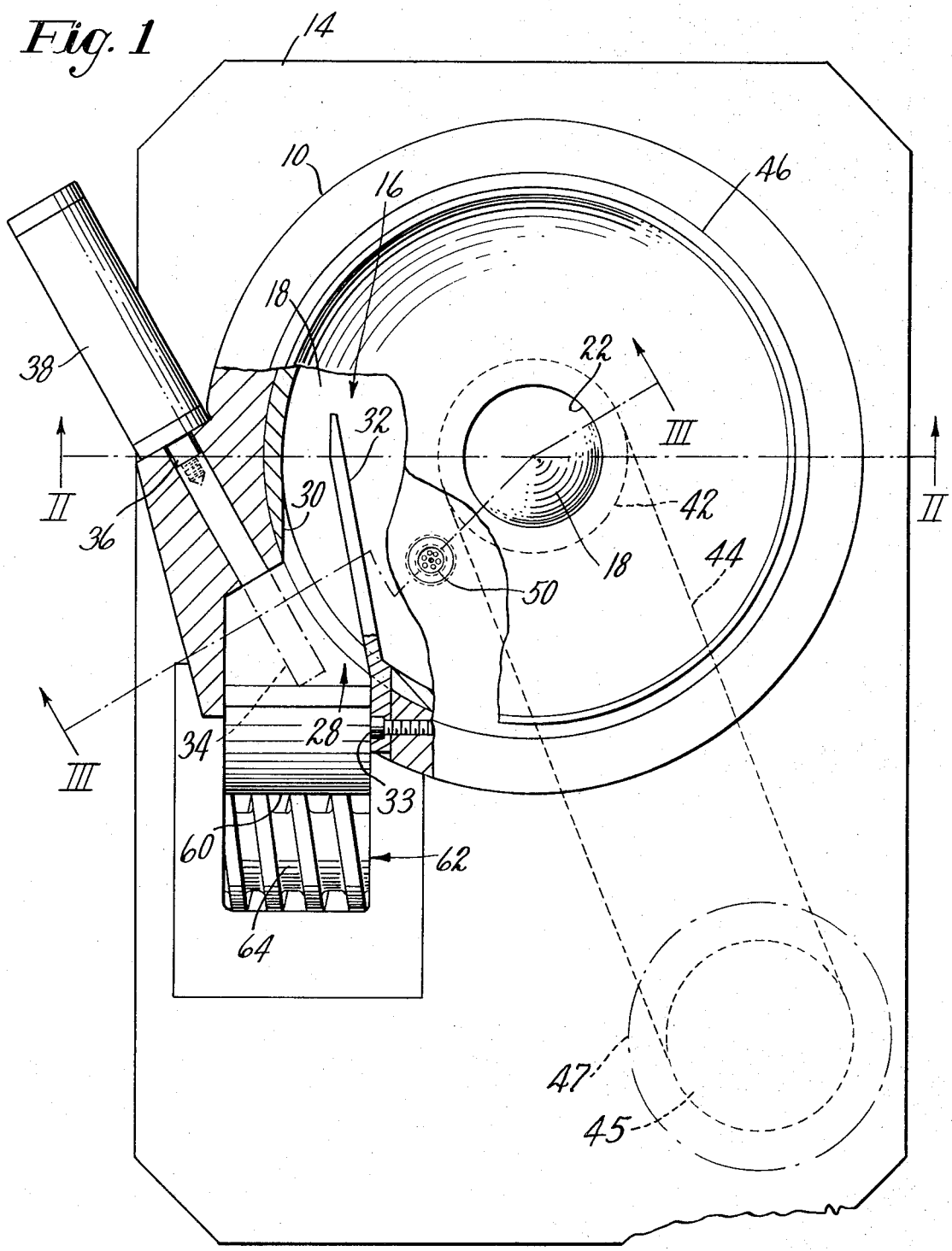
FIG. 1 is a plan view, partly in section, of a typical mixing device embodying the invention and adapted to supply a mixture to an injection molding machine.
Figure 2:
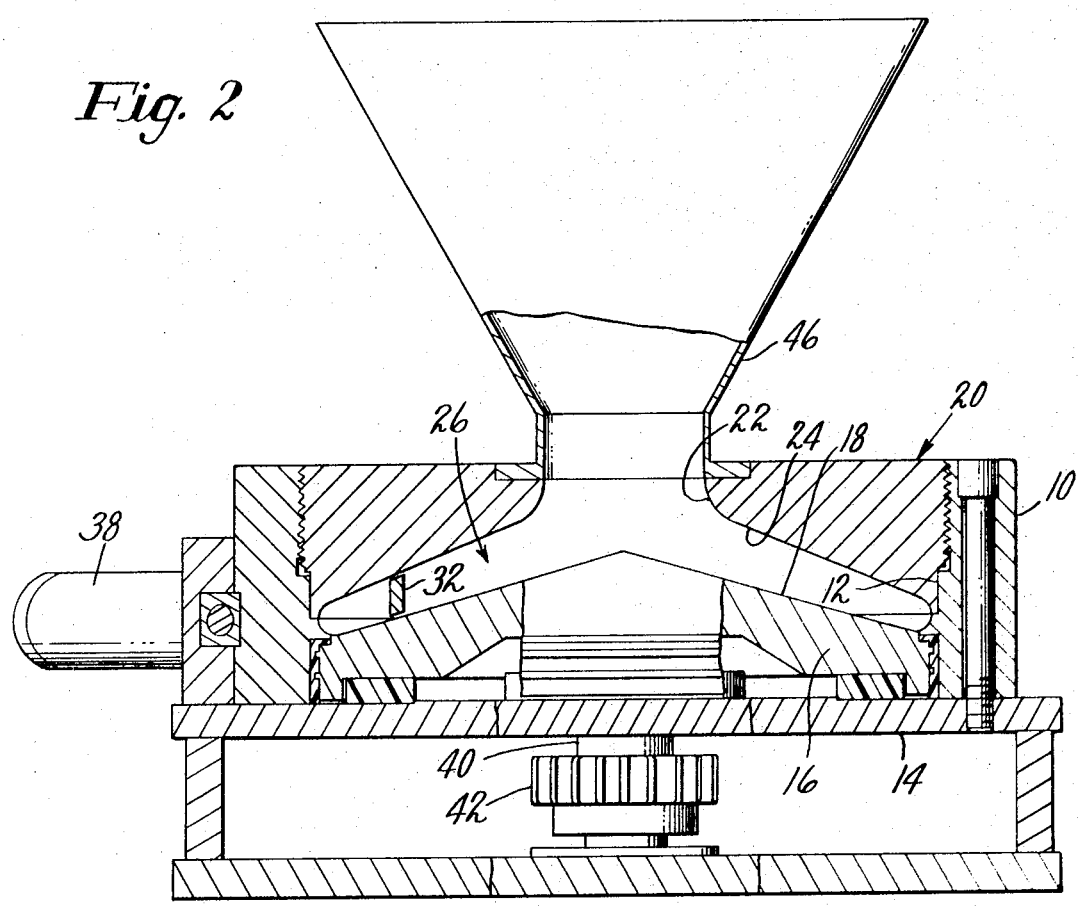
FIG. 2 is a section substantially on line II—II of FIG. 1.
Figure 3:
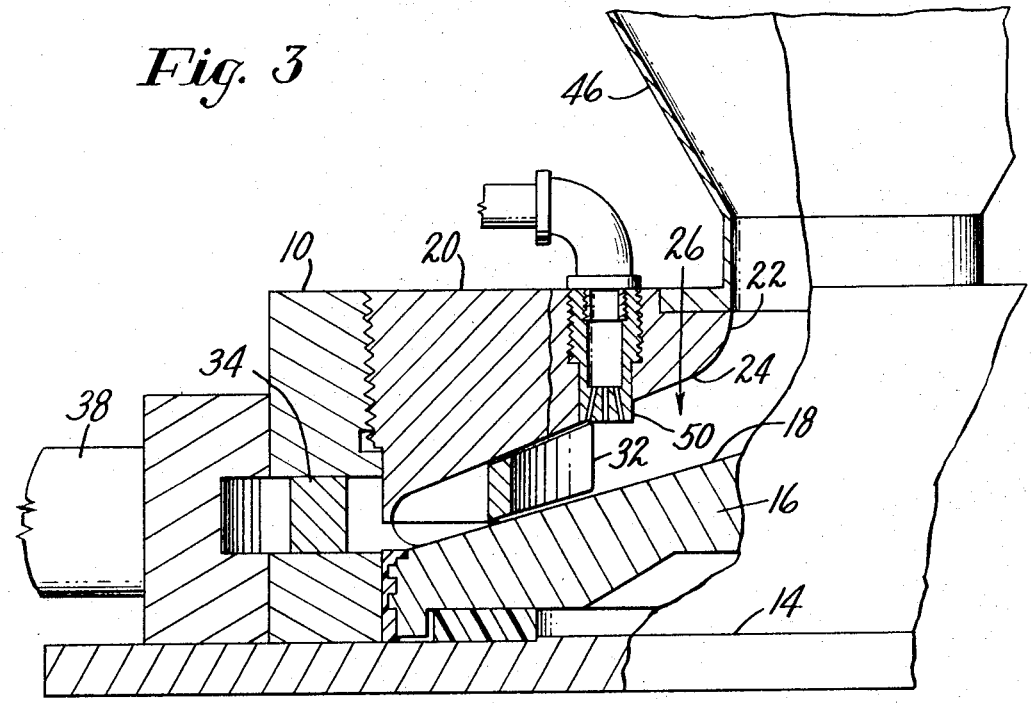
FIG. 3 is a section in enlarged scale substantially on line III—III of FIG. 1.

Referring to the drawings, there is shown a mixing unit embodying the invention and which by way of example is adapted to mix substantially dry ingredients such as glass fibers and $CaCO_3$ and liquid ingredients such as catalyzed polyester for injection into a mold by a reciprocating screw-type injection molding unit to produce plastic articles reinforced with glass fibers.

The mixing unit comprises a body 10 having a cylindrical cavity 12 closed at its lower end by a baseplate 14. A circular plate 16 is mounted in the lower end of the cavity for rotation in the baseplate and is provided with a conical face 18. The upper end of the cavity 12 is internally threaded and receives external threads on an annular member 20. The member 20 is provided with a central opening 22 and a surface 24 extending therefrom and spaced from the face 18 of the plate 16 to form a mixing chamber 26.

The body 10 is provided with an outlet opening 28 which is aligned with an opening 30 in the annular member 20 at the periphery of the face 18 of the circular plate 16. A blade 32 is secured at 33 to the body and extends inwardly through the openings 28 and 30 into the peripheral portion of the chamber 26. The body is also provided with a throttle plate 34 which extends into the outlet opening 28. The plate 34 is mounted for reciprocation in the body and is secured at its outer end to a rod 36 of a piston movable in a cylinder 38 fixed to the body for a purpose which will appear.

The circular plate 16 has a depending shaft 40 by which it is mounted for rotation in the baseplate 14. At its lower end, the shaft has a sprocket 42 connected by a chain 44 to a sprocket 45 which is driven by a motor 47 so that the circular plate is constantly rotated in a counterclockwise direction as seen in FIG. 1. The annular member 20 has secured thereto the lower end of a hopper 46 having an opening communicating with the central opening 22 of the member. Extending through the surface 24 of the annular member is a nozzle 50 through which a liquid such as a catalyzed polyester is to be pumped into the chamber 26 from a source not shown.

In the operation of the mixing unit, dry ingredients such as glass fibers and a filler such as $CaCO_3$ are placed in the hopper 46. The dry ingredients are fed from the bottom of the hopper through the opening 22 and deposited on the apex of the rotating conical face 18 of the circular plate 16. The dry ingredients are thus mixed by agitation on the face 18 and are moved by centrifugal force outwardly along the face 18 into the chamber 26 formed between the moving face 18 and the stationary surface 24 of the annular member 20. As the dry ingredients move into the chamber the liquid ingredient is sprayed thereon from the nozzle 50, thoroughly wetting the dry ingredients and forming a viscous mass of the liquid and dry ingredients. As the viscous mass continues to be moved outwardly by centrifugal force along the face 18, the ingredients are subjected both to shearing forces according to hydrodynamic principles which cause internal mixing, as well as to external forces which cause the mass to be rolled between the moving face 18 and the stationary surface 24. This combined action causes a thorough wetting of the glass fibers and fillers with the resin without chopping or breaking the fibers into ineffectual short lengths.

The intensity of the overall mixing action can readily be varied without departing from the scope of the invention. To increase the external mixing action of the dry ingredients a variety of agitator profiles suitable to the materials to be mixed can be provided on the central portion of the conical face. To increase the internal mixing effect the face of the rotating plate and/or the stationary surface can be provided with shear profiles rather than the smooth surfaces shown. Further to vary the mixing action, the space between the circular plate and the surface 24 can be varied in a wide range by adjusting the annular member 20 by the threaded engagement with the body 10. In addition, the speed of rotation of the plate may be varied depending on the materials and mixing action desired. Further, depending on the materials to be mixed, either or both the rotary plate and the annular member and body may be heated or cooled. By the addition of other nozzles and openings at different radii, sequential mixing of a wide variety of ingredients is possible. By the use of multiple discs, other sequential mixing opportunities are obvious without departing from the scope of the invention.

As the viscous mass is mixed and moved toward the periphery of the circular plate, the blade 32 directs the mass into a pressure head which flows into the outlet opening 28. The position of the throttle plate 34 is varied by operation of the cylinder 38. This changes the size of the outlet opening and hence also varies the back pressure on the viscous mass to determine the residence time and extent of mixing of the mass in the chamber.

Referring to FIG. 1, there is seen an inlet opening 60 through which the mixture discharged from the mixing unit is fed to a reciprocating screw-type injection unit 62. A screw 64 is adapted to feed the mixture along a chamber and into a mold. Such a unit is shown herein as a typical use for the mixing device where a mixture to be molded may be mixed and fed to a mold or an extruder either in a continuous or intermittent manner.

It should be understood that the foregoing description is given by way of example of a preferred embodiment illustrative of the invention. It should be apparent that substitution of various equivalent parts made be made for the various elements illustrated without departing from the scope of the invention defined by the following claims.

Having thus described my invention, what I claim as new and desire to secure by Letters Patent of the United States is:

1. A mixing device comprising a body portion having a mixing chamber
    a circular plate rotatably mounted in the body and having a face forming one side of the chamber
    said body having an opening through which dry ingredients are deposited on the face of the plate for mixing by agitation, said dry ingredients being moved by centrifugal force toward the periphery of the plate as it rotates
    said body also having a stationary annular surface extending from the opening and spaced from the face of the plate to form the other side of the chamber
    an inlet extending through said surface for admitting liquid ingredients into the chamber for wetting the dry ingredients as they are moved by centrifugal force to form a viscous mass which is mixed between said face and said surface by internal shear forces
    and an outlet in said body at the periphery of the plate through which the mixed viscous mass is fed.

2. A device according to claim 1 in which is provided a member in said chamber for directing the mixed viscous mass toward said outlet.

3. A device according to claim 2 in which said member is a blade extending between said face and said surface spaced from the periphery of said plate to form a passage leading toward said outlet.

4. A device according to claim 3 in which the outlet is provided with an adjustable throttle for variably restricting the outlet end of said passage to cause a variable back pressure on the viscous mass in said chamber.

5. A device according to claim 1 in which the outlet is provided with a throttle for causing a back pressure on the viscous mass.

6. A device according to claim 1 in which the chamber is provided with a member adjacent the periphery of the plate face for directing the mixed viscous mass toward said outlet and the outlet is provided with a throttle for causing a back pressure on the viscous mass.

7. A device according to claim 1 in which the space between the face and said surface diminishes as it extends toward the periphery of the plate.

8. A device according to claim 7 in which the plate is provided with a conical face and the dry ingredients are deposited through the opening onto the apex of said face.

9. A device according to claim 1 in which said opening is coaxial with the axis of said plate and the central portion of said face is rough to cause the dry ingredients deposited thereon to be agitated.

10. A device according to claim 1 in which the body is provided with an annular stator on which is formed said surface and the stator is adjustably mounted in the body for axial movement to vary the space between said surface and the face of said plate.

* * * * *